(12) United States Patent
Kaushal et al.

(10) Patent No.: US 8,167,608 B2
(45) Date of Patent: May 1, 2012

(54) MELT CHANNEL GEOMETRIES FOR AN INJECTION MOLDING SYSTEM

(75) Inventors: Hitesh Kaushal, Brampton (CA); Harold Godwin, Fergus (CA)

(73) Assignee: Mold-Masters (2007) Limited, Georgetown, ON (CA)

( * ) Notice: Subject to any disclaimer, the term of this patent is extended or adjusted under 35 U.S.C. 154(b) by 47 days.

(21) Appl. No.: 12/768,522

(22) Filed: Apr. 27, 2010

(65) Prior Publication Data

US 2010/0272849 A1    Oct. 28, 2010

Related U.S. Application Data

(60) Provisional application No. 61/172,824, filed on Apr. 27, 2009.

(51) Int. Cl.
*B29C 45/22* (2006.01)
(52) U.S. Cl. ................ 425/572; 264/297.2; 425/588
(58) Field of Classification Search ............. 264/297.2, 264/328.8, 328.12; 425/572, 588
See application file for complete search history.

(56) References Cited

U.S. PATENT DOCUMENTS

| | | |
|---|---|---|
| 3,936,262 A | 2/1976 | Hehl |
| 3,977,820 A | 8/1976 | Beyerlein et al. |
| 4,033,485 A | 7/1977 | Kohler |
| 4,256,140 A | 3/1981 | Swaroop et al. |
| 4,299,553 A | 11/1981 | Swaroop |
| 4,395,222 A | 7/1983 | Gaiser et al. |
| 4,412,807 A | 11/1983 | York |
| 4,451,224 A | 5/1984 | Harding |
| 4,648,546 A | 3/1987 | Gellert |
| 4,925,384 A | 5/1990 | Manner |
| 5,834,041 A | 11/1998 | Sekine et al. |
| 6,077,470 A | 6/2000 | Beaumont |
| 6,234,783 B1 | 5/2001 | Shibata et al. |
| 6,503,438 B2 | 1/2003 | Beaumont et al. |
| 6,544,028 B2 * | 4/2003 | Wright et al. ............ 425/572 |
| 6,583,731 B2 * | 6/2003 | Chan et al. ............. 340/931 |
| 6,796,786 B2 | 9/2004 | White et al. |
| 7,029,260 B2 * | 4/2006 | Godwin et al. ............ 425/143 |
| 7,270,538 B2 * | 9/2007 | Sicilia .................. 425/566 |
| 7,287,977 B2 * | 10/2007 | Serniuck et al. .......... 425/564 |

(Continued)

FOREIGN PATENT DOCUMENTS

DE    3310928    9/1984

(Continued)

OTHER PUBLICATIONS

International Search Report, PCT/CA2010/000599, Jul. 12, 2010.

*Primary Examiner* — Timothy Heitbrink
(74) *Attorney, Agent, or Firm* — Medler Ferro PLLC

(57) ABSTRACT

An injection molding system is disclosed that utilizes a melt channel wherein at least a portion of the melt channel has a noncircular cross-section for balancing shear in a melt stream of moldable material that flows therethrough. The noncircular cross-section of the melt channel portion may be, for e.g., capsule-shaped, extended egg-shaped, oval, teardrop-shaped, or peanut-shaped. A flow splitter is also disclosed that is positioned offset from a central axis of an upstream melt channel to protrude between inlets of respective downstream melt channels, where the upstream melt channel splits into the downstream melt channels, to thereby create a narrower inlet into one of the downstream melt channels and a wider inlet into the other of the downstream melt channels.

20 Claims, 6 Drawing Sheets

U.S. PATENT DOCUMENTS

| | | |
|---|---|---|
| 7,320,589 B2 | 1/2008 | Babin et al. |
| 7,399,442 B2 | 7/2008 | Sabin et al. |
| 7,713,046 B2 | 5/2010 | Fairy |
| 7,731,489 B2 | 6/2010 | Fairy |
| 7,780,895 B2 * | 8/2010 | Beaumont ................ 264/328.12 |
| 2001/0022321 A1 | 9/2001 | Bouti |
| 2002/0121713 A1 | 9/2002 | Moss et al. |
| 2007/0077328 A1 | 4/2007 | Olaru et al. |
| 2008/0317896 A1 | 12/2008 | Boxwala et al. |
| 2009/1002898 | 1/2009 | Brelski |

FOREIGN PATENT DOCUMENTS

| | | |
|---|---|---|
| WO | WO-2005/113215 A1 | 12/2005 |

* cited by examiner

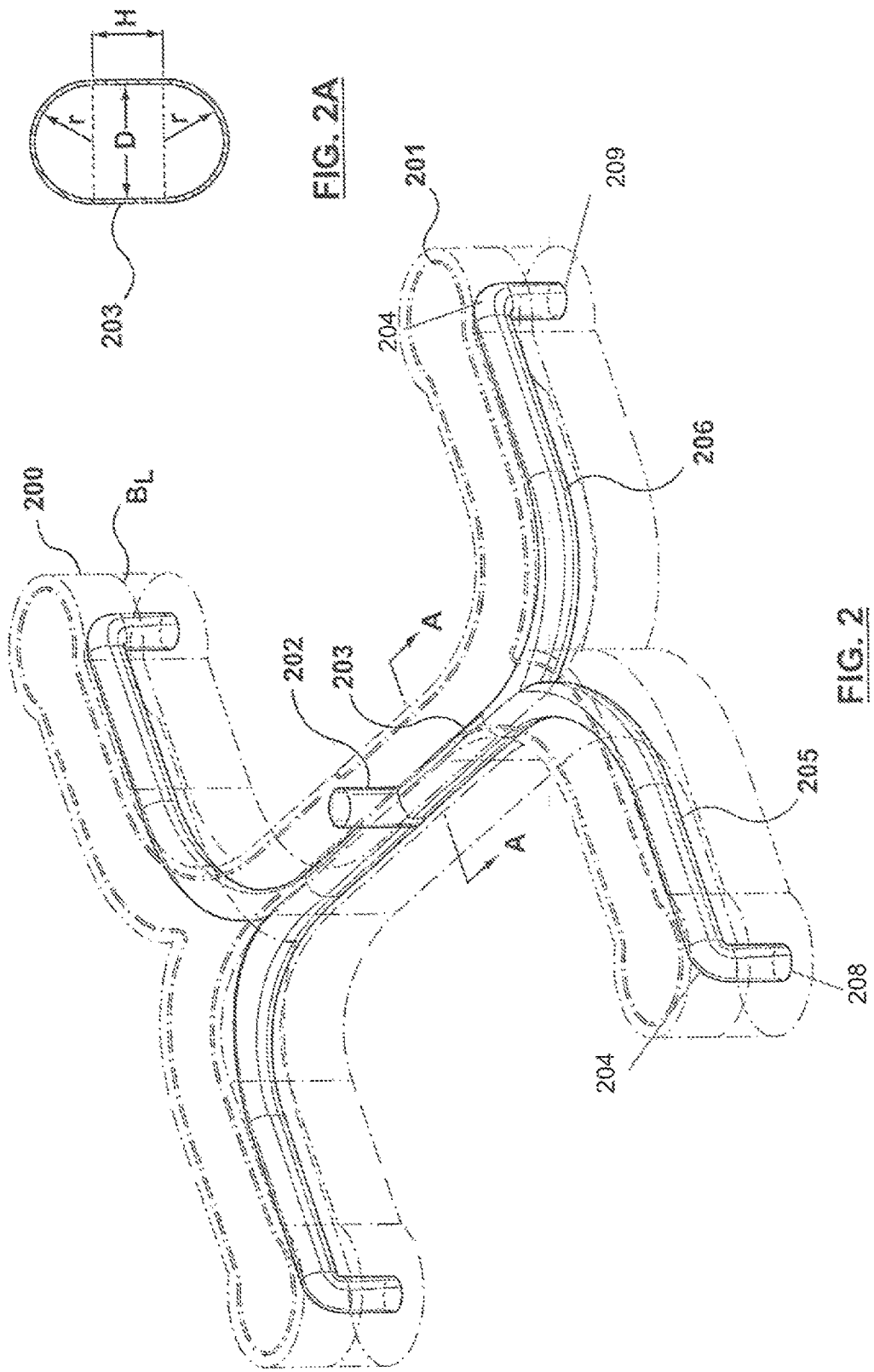

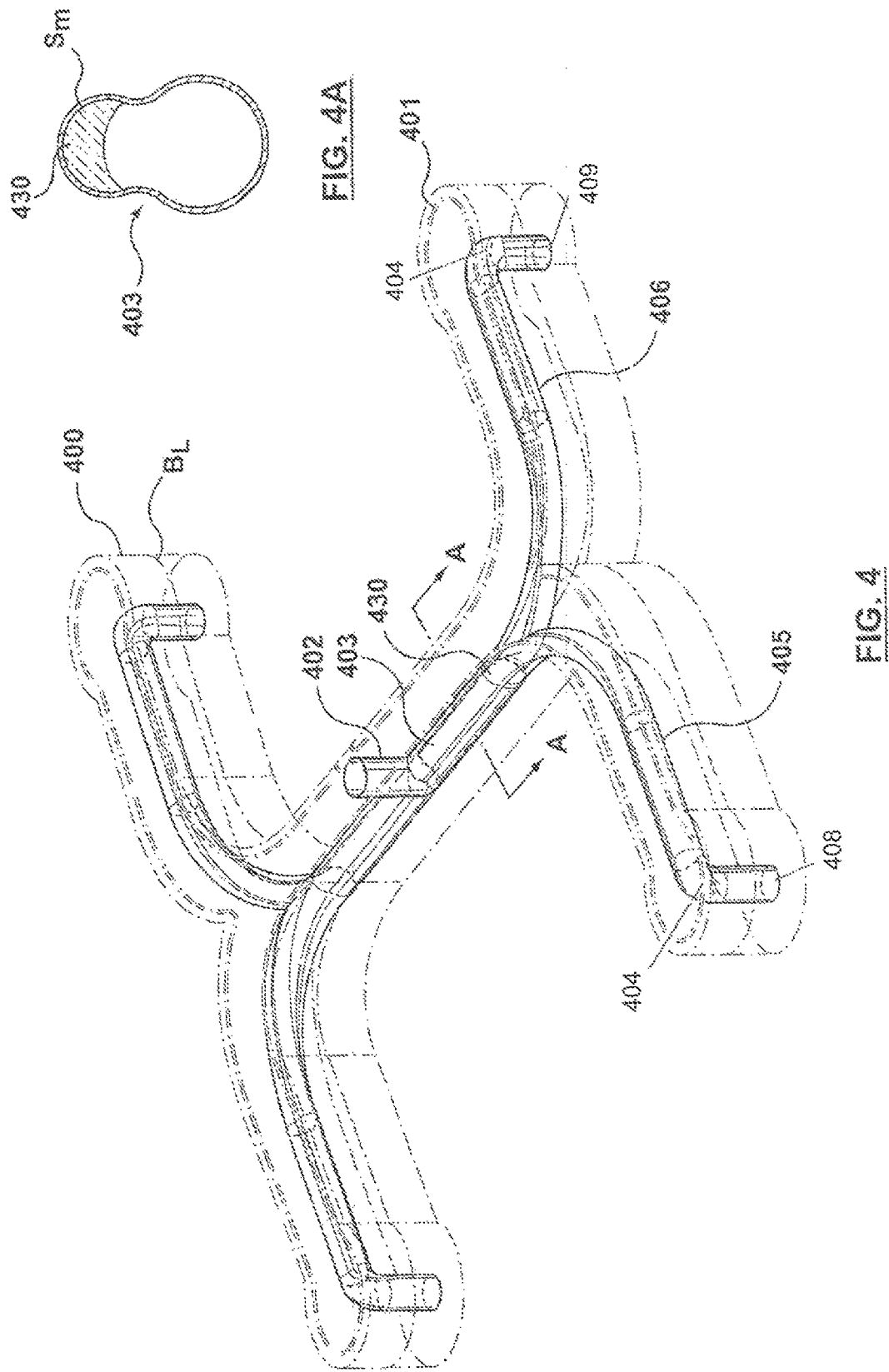

MELT CHANNEL GEOMETRIES FOR AN INJECTION MOLDING SYSTEM

CROSS-REFERENCE TO RELATED APPLICATION

This application claims the benefit under 35 U.S.C. §119 (e) of U.S. Appl. No. 61/172,824 filed Apr. 27, 2009, the disclosure of which is incorporated by reference herein in its entirety.

FIELD OF THE INVENTION

The invention relates generally to an injection molding system, and more specifically to the melt channel geometries for balancing or improving properties of a melt stream of moldable material flowing through the components along the melt path of the injection molding system.

BACKGROUND OF THE INVENTION

The use of manifolds in injection molding systems to transfer a melt stream from a melt source to one or more nozzles for delivering melt to one or more mold cavities is well known in the art. Furthermore, it is well known that in many hot runner injection molding applications it is important that a manifold melt channel layout, which is also known in the art as a runner system, be provided such that each mold cavity receives the same flow of melt having the same temperature and the same shear history. Such systems can be described as "balanced." Balancing of the manifold runner system is important in order to achieve a greater consistency, or homogeneity, of the melt stream as it is divided from a single melt stream at the manifold inlet to a plurality of manifold outlets, which correspond with a plurality of mold cavities in a multi-cavity application or family molding applications. The result of balancing the melt stream is an overall increase in quality and uniformity of molded parts being formed, when compared to parts formed in systems that are not balanced as such.

Conventional balancing of the melt stream includes designing the manifold to have geometrically matching runner layouts; that is, matching diameters, equal runner lengths, number of turns, and melt channel level changes in each melt path from the manifold inlet to a respective mold cavity. However, at times, despite having matched runner layouts, the melt stream may be different from cavity to cavity due to shear heating of the melt stream as it is forced along the melt path through the runners. More specifically, when the melt stream is forced under pressure through a bore, that is, a runner or manifold channel as is done in a hot runner manifold, the melt stream experiences shear, in the area adjacent to the bore or channel wall with a corresponding localized elevation of the temperature. The result is a temperature differential across the bore or melt channel, with the center of the melt stream being cooler than the melt material closer to the bore or channel wall. This phenomenon is repeated at every split and/or turn of the melt stream along the melt path and may lead to an imbalance of shear-heated material between runners and subsequently between cavities of the injection molding apparatus.

Although a variety of devices and methods exist or have been proposed for addressing the need for balancing the melt delivered between cavities of a hot runner injection molding system, a need still exists for balancing or improving properties of a melt stream of moldable material flowing through a hot runner manifold so that each cavity of the system receives a consistent or homogenous melt to thereby produce improved part to part consistency.

SUMMARY OF THE INVENTION

Embodiments hereof are directed to an injection molding system that includes a hot runner component having at least one melt channel for conducting a melt stream of moldable material therethrough wherein at least a portion of the melt channel has a noncircular cross-section for balancing shear in the melt stream.

Another embodiment hereof is directed to an injection molding system that includes a hot runner manifold having at least one melt channel for conducting a melt stream of moldable material therethrough wherein at least a portion of the melt channel has a noncircular cross-section for balancing shear in the melt stream. The noncircular cross-section of the at least a portion of the melt channel may be of, for e.g., a capsule-shaped cross-section, an extended egg-shaped cross-section, an oval cross-section, a teardrop-shaped cross-section, or a peanut-shaped cross-section.

Another embodiment hereof is directed to an injection molding system including a hot runner manifold having melt channels for conducting a melt stream of moldable material received from a melt source to a plurality of hot runner injection molding nozzles. The melt channels include at least one upstream melt channel that splits into at least two downstream melt channels wherein a flow splitter is positioned offset from a central axis of the upstream melt channel to protrude between respective inlets of the downstream melt channels and thereby create a narrower inlet into one of the downstream melt channels and a wider inlet into the other of the downstream melt channels.

BRIEF DESCRIPTION OF DRAWINGS

The foregoing and other features and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIG. 2 is a perspective view of a hot runner manifold shown in phantom with a melt channel configuration in accordance with an embodiment hereof with FIG. 2A showing a cross-section along line A-A of FIG. 2.

FIG. 4 is a perspective view of a hot runner manifold shown in phantom with a melt channel configuration in accordance with another embodiment hereof with FIG. 4A showing a cross-section along line A-A of FIG. 4.

DETAILED DESCRIPTION OF THE INVENTION

Specific embodiments of the present invention are now described with reference to the figures. The following detailed description is exemplary in nature and is not intended to limit the invention or the application and uses of the invention. In the following description, "downstream" is used with reference to the direction of mold material flow from an injection unit to a mold cavity of an injection molding system and also to the order of components or features thereof through which the mold material flows from an inlet of the injection molding system to a mold cavity, whereas "upstream" is used with reference to the opposite direction. Although the description of the invention is in the context of a manifold in a hot runner injection molding system, the invention may also be used in any melt channel along the melt path from the melt source to the mold cavity where it is deemed useful. Furthermore, there is no intention to be bound by any expressed or implied theory presented in the preceding technical field, background, brief summary or the following detailed description.

Figure 1:
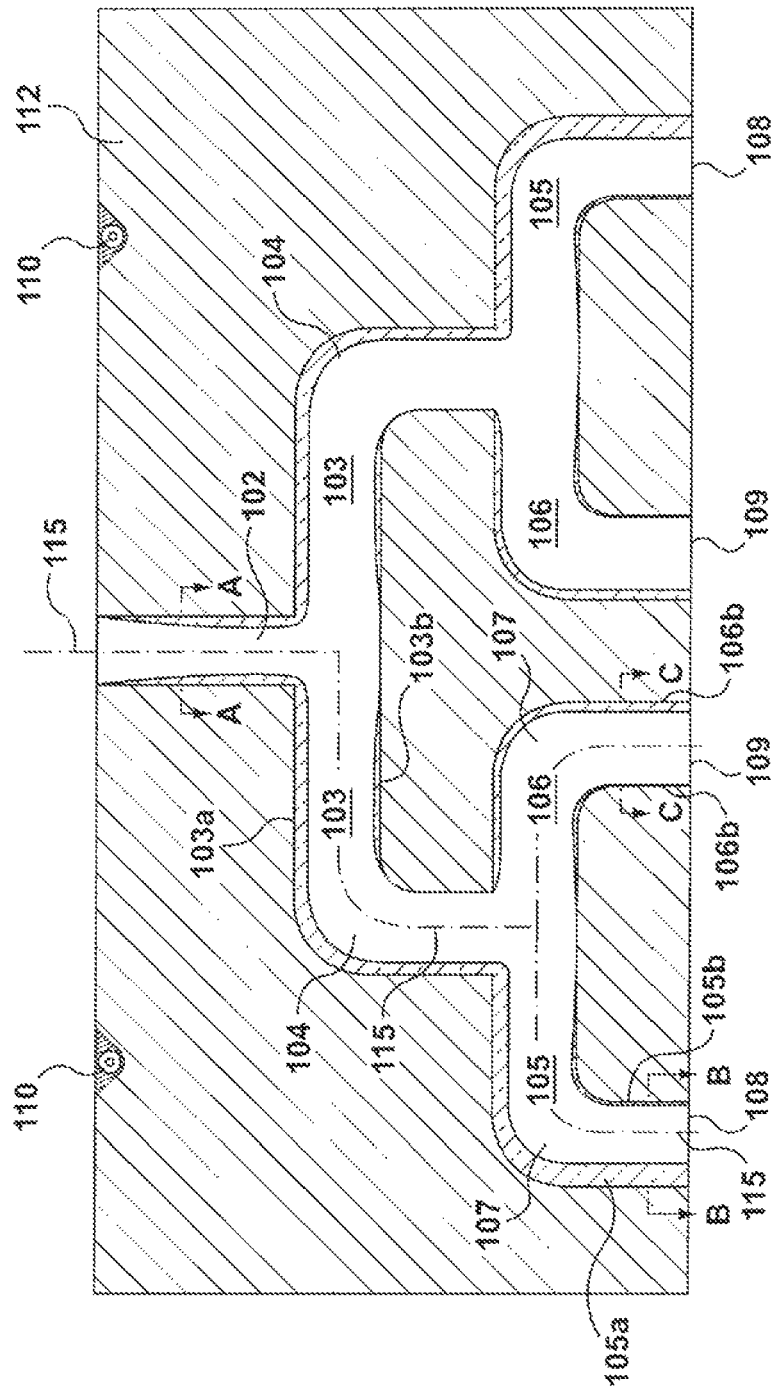
FIG. 1 is a cross-sectional view of a prior art hot runner manifold.

FIG. 1 is a cross-sectional view of a prior art hot runner manifold 112 of a multi-channel injection molding system. It would be understood by one of ordinary skill in the art that in an embodiment, hot runner manifold 112 may be of a two-piece brazed, or one piece drilled construction. A melt stream of moldable material enters manifold 112 along an inlet channel 102. The melt stream is maintained at a moldable temperature by manifold heaters 110, a nonlimiting example of which includes the illustrated resistance wires shown. The melt stream then divides and enters identical and opposite primary melt channels 103 and flows around a first approximately 90-degree turn, or first melt channel level change 104. The melt stream then divides again and enters identical and opposite secondary melt channels 105, 106, which each include a second approximately 90-degree turn, or second melt channel level change 107. The melt stream then exits manifold 112 through outlets 108 and 109, which are positioned after the second melt channel level changes 107 of secondary melt channels 105, 106 respectively. Each outlet 108, 109 is in fluid communication with the melt channel of a hot runner nozzle (not shown) to deliver the melt stream to a mold cavity of a mold (not shown).

Figure 1A:
FIGS. 1A, 1B, and 1C are sectional views taken along lines A-A, B-B, and C-C, respectively, of FIG. 1.
Figure 1B:
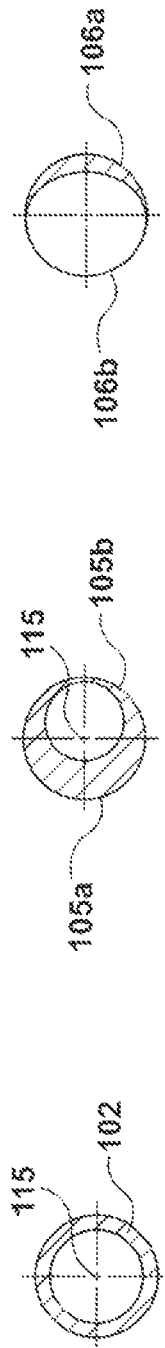
Figure 1C:

As is conventional, each of the melt channels 102, 103, 105, 106, and melt channel level changes 104 and 107 of hot runner manifold 112 has a circular cross-section. Shear stress is created in the melt stream along the walls of inlet channel 102 as depicted in FIG. 1A, which is a cross-sectional shear profile of the melt stream along line A-A of FIG. 1, and is essentially balanced or symmetrical across inlet channel 102. When the melt stream exiting inlet channel 102 splits into primary melt channels 103, shear stress in the melt stream is greater along side 103a than on side 103b of melt channels 103, such that there is a greater distribution of sheared material on the inlet side of primary melt channel 103. As the melt stream flows through primary melt channels 103, shear stress is naturally created to a lesser extent along side 103b. However, any shear stress formed by friction along side 103a is added to the shear history of the melt stream from inlet channel 102, forming an asymmetrical shear stress profile, or in other words, a side-to-side shear stress imbalance within primary melt channels 103. Shear stress imbalance is further amplified as the melt stream flows along primary melt channels 103, through melt channel level changes 104 thereof and divides into secondary melt channels 105, 106. Shear stress and thus the temperature and velocity profile of the melt stream along and across melt channels 105 and 106 becomes even more unevenly distributed and unevenly balanced after passing through second melt channel level change 107 on the way to manifold outlets 108 and 109 respectively. The variation of shear stress in the melt stream that occurs across secondary melt channel 105, from side 105a to side 105b, after completing second melt channel level change 107 on the way to outlet 108 is depicted in FIG. 1B, which is a cross-sectional shear stress profile along line B-B of FIG. 1. The variation of shear stress in the melt stream that occurs across secondary melt channel 106, from side 106a to side 106b, after completing second melt channel level change 107 on the way to outlet 109 is depicted in FIG. 1C, which is a cross-sectional shear stress profile along line C-C of FIG. 1. FIGS. 1B and 1C illustrate distinct side-to-side variations and thus uneven cross-sectional distribution of shear stress, temperature and viscosity in the respective melt streams with respect to a central axis 115 of the manifold melt channels.

A comparison of cross-sectional shear profiles of FIGS. 1B and 1C indicates that the amount of shear stress between secondary melt channels 105, 106 differs greatly. Since shear stress profiles are also an indication of temperature, velocity and viscosity profiles, the melt stream that leaves secondary melt channel 105 through outlet 108 has a much higher temperature on the outer and intermediate portion of the melt stream than the melt stream that leaves secondary melt channel 106 through outlet 109. Thus, the temperature and pressure of the melt stream received by a mold cavity in fluid communication with outlet 108 of manifold 112 is different than the temperature and pressure of the melt stream received by a mold cavity in fluid communication with outlet 109 of manifold 112, which may lead to inconsistently molded products from one mold cavity to another. Further, melt streams of moldable material having uneven or non-symmetrical shear stress and temperature cross-sectional profiles may have different flow characteristics from one side to the other of a single mold cavity (not shown) and thereby produce a molded product of poor quality.

Embodiments in accordance herewith address unbalanced melt flow through the melt channels of a hot runner manifold by altering the geometry from a conventional round or circular cross-section in at least a portion of the manifold melt channels in order to manage or control the properties of the melt stream as it flows through the manifold melt channels for delivery to the mold cavities.

FIG. 2 is a perspective view of a hot runner manifold 200 with a melt channel configuration in accordance with an embodiment hereof. Features and aspects of the other embodiments may be used accordingly with the current embodiment. FIG. 2A depicts a cross-section of FIG. 2 along line A-A. One of ordinary skill in the art will appreciate that a body of manifold 200 is depicted with phantom lines for the purpose of illustrating the configuration of the melt channels within. Manifold 200 contains a heater 201, also shown in phantom, connected to a power source (not shown) for heating manifold 200 and subsequently the melt stream within the melt channels to a desired processing temperature. Manifold 200 may also contain other accessories such as a thermocouple (not shown) for monitoring the temperature of manifold 200 and providing feedback information to the power source.

Manifold 200 includes an inlet channel 202 that is in fluid communication with the melt channel of an inlet extension, or sprue (not shown) connected thereto, and serves to deliver the melt stream from a melt source (not shown) to a primary melt channel 203. As noted above, the cross-section of primary melt channel 203 is depicted in FIG. 2A. Rather than having a circular cross-section, as shown in conventional manifold 112 of FIG. 1, primary melt channel 203 of manifold 200 has a double D, or capsule-shaped cross-section, which may also be referred to as an extended egg-shaped or oval cross-section, as shown in FIG. 2A. More particularly, the capsule-shaped cross-section includes semicircular end portions having a radius "r" joined by a rectangular-shaped midsection having a width or diameter "D" and a height or length "H". Width "D" is equal to 2r or a diameter of a circle formed by joining the semicircular end portions. Primary melt channel 203 divides into secondary melt channels 205, 206. As shown in FIG. 2, secondary melt channels 205, 206 each have capsule-shaped cross-sections as described above with respect to primary melt channel 203. In another embodiment (not shown) secondary melt channels 205, 206 may have circular cross-sections or any of the noncircular cross-sections described herein. Each of secondary melt channels 205, 206 ends at a level change 204 that is in fluid communication with a manifold outlet 208, 209, respectively, which in turn may each be in fluid communication with a melt channel of a hot runner nozzle (not shown) to deliver the melt stream to a mold cavity of a mold (not shown).

In a conventional hot runner design, under the influence of a given injection pressure, a diameter of a manifold channel having a circular cross-section allows a certain volume of melt flow therethrough. The volume of melt flow is in direct relation to the surface area of the wall of the manifold channel. As the melt travels through the manifold channel, shear stress imparts a certain amount of shear to the portion of the melt stream proximate the wall of the melt channel. The circular cross-section of the conventional melt channel results in a central portion of the melt stream experiencing little to no shear, see for example FIG. 1A. In order to impart shear to a greater portion or volume of the melt stream, which may subsequently result in a more balanced melt stream, as the melt flows through the manifold the capsule-shaped cross-section increases the surface area of primary melt channel 203 of FIG. 2 when compared to the surface area of a conventional runner or melt channel 103 with a comparable volume. The table below compares a conventional manifold melt channel having a circular cross-section with a diameter of 19 mm with a manifold melt channel in accordance with embodiments hereof having a capsule-shaped cross-section with a width or diameter "D" of 14 mm, 15 mm and 17 mm respectively.

|  | Circular Cross-section | Capsule-Shaped Cross-section | Capsule-Shaped Cross-section | Capsule-Shaped Cross-section |
| --- | --- | --- | --- | --- |
| Diameter/Width (mm) | 19 | 17 | 15 | 14 |
| Rectangle Height (mm) | n/a | 3.3 | 7.1 | 9.2 |
| Cross-sectional Area (mm²)—A | 284 | 284 | 284 | 284 |
| Perimeter (mm)—P | 59.7 | 60.1 | 61.3 | 62.5 |
| Ratio P/A | .2105 | .2118 | .2164 | .2204 |

As can be seen from the table above, a comparison between a conventional circular manifold channel design and each of the capsule-shaped manifold channel embodiments, for generally the same cross-sectional area, each of the capsule-shaped manifold channel embodiments has a greater perimeter than the conventional circular manifold channel. The greater perimeter translates into an overall increased surface area in a melt channel having a capsule-shaped cross-sectional configuration. In other words, for the same volume of melt flowing through a 14 mm, 15 mm or 17 mm capsule-shaped manifold channel as would flow through a conventional 19 mm circular manifold channel an increase in the perimeter in the 14 mm, 15 mm or 17 mm capsule-shaped manifold channel, due to the cross-sectional geometries thereof, will provide shear to a greater amount of the melt stream passing therethrough than would otherwise be realized in the conventional circular manifold channel. As the melt stream continues downstream and passes through the remainder of the manifold melt channels, whether having circular cross-sections or capsule-shaped cross-sections, as shown in secondary melt channels 205 and 206 of FIG. 2, the melt stream will have more shear to be split and therefore a more balanced melt stream, that is, having less of a range of sheared material between melt streams, will eventually be delivered to the mold cavities.

Other benefits of manifold melt channels having the capsule-shaped cross-section in accordance herewith is that larger volume channels are narrower than conventional manifold channels having the same cross-sectional area and therefore provide flexibility in the design of injection molding applications having tight pitch large cavitation, or applications where it is desirable to place the melt channel adjacent to a an obstruction such as a through hole while still maintaining the structural integrity of the manifold. In addition, a manifold heater may be positioned proximate a side of the rectangular-shaped midsection of manifold channel 203 allowing more uniform heating of the melt stream.

Continuing with FIG. 2, manifold 200 with a capsule-shaped runner configuration may be formed from two complementary or mirrored plates that are brazed or otherwise integrally fastened together along complementary surfaces as shown at BL. An equal portion of the capsule-shaped manifold channel may be formed within the contacting surface of each plate or may be offset to one or the other side of the manifold. In an alternative embodiment, manifold 200 may not be brazed or otherwise integrally fastened together, but instead is removably fastened together by bolts, or other fasteners (not shown) to facilitate cleaning of inlet channel 202, and capsule-shaped melt channels 203, 205, 206. In another embodiment, manifold 200 could be manufactured from a "lost wax" or other casting process. In yet another embodiment, manifold 200 could be manufactured by a process of additive manufacturing, nonlimiting examples of which include direct metal laser sintering and selective laser sintering without departing from the scope of the present invention.

Manifold 300 includes an inlet channel 302, which is in fluid communication with the melt channel of an inlet extension or sprue (not shown) connected thereto, and serves to deliver the melt stream from a melt source (not shown) to primary melt channel 303. A cross-section of primary melt channel 303 taken along line A-A is depicted in FIG. 3A.

One benefit of manufacturing a manifold with a capsule-shaped melt channel in accordance with embodiments hereof is smoother transitions between, and fast machining of, manifold channels having capsule-shaped cross-sections due to less tooling changes being required between a capsule-shaped channel to a circular channel of the same diameter. More particularly, less tooling changes are required for machining the transition between a 14 mm capsule-shaped cross-section manifold channel to a circular 14 mm manifold channel as compared to the tooling changes required for machining the transition between a circular 19 mm diameter manifold channel to a circular 14 mm diameter manifold channel.

Another benefit of manufacturing a manifold with capsule-shaped melt channels in accordance with embodiments hereof is a reduction in the hoop stresses/pressure on the brazing, or other method of attaching the manifold halves described elsewhere herein, as compared to a conventional manifold due to the increased surface area of the wall of the capsule-shaped melt channels.

Figure 3:
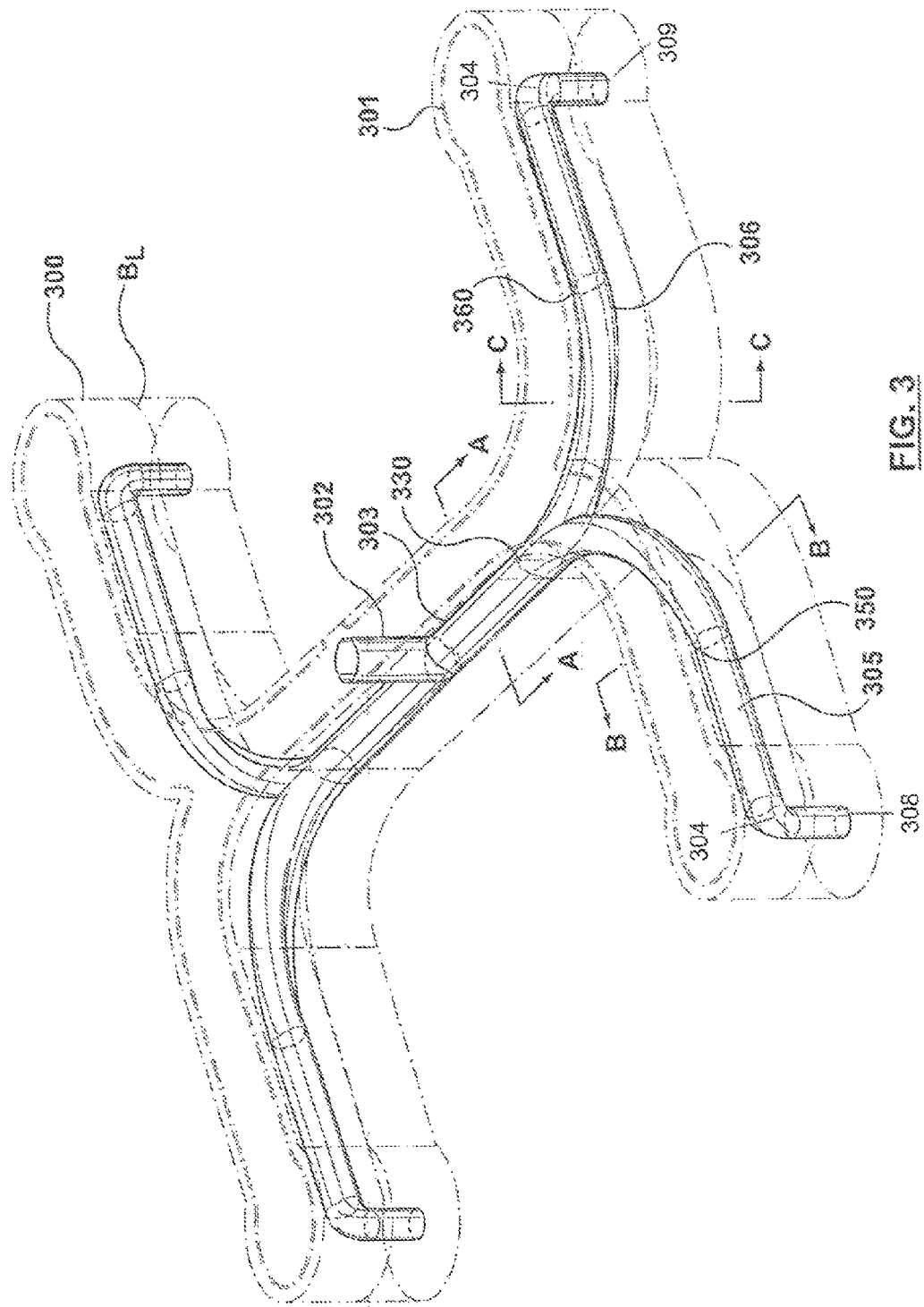
FIG. 3 is a perspective view of a hot runner manifold shown in phantom with a melt channel configuration in accordance with another embodiment hereof with FIGS. 3A, 3B and 3C being cross-sectional views taken along lines A-A, B-B and C-C, respectively, of FIG. 3.
Figure 3C:
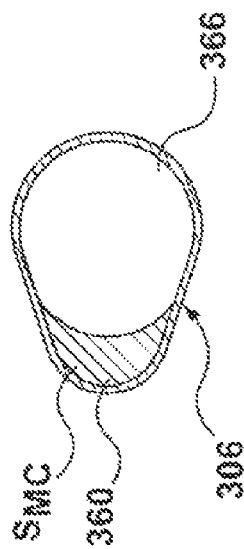
Figure 3B:
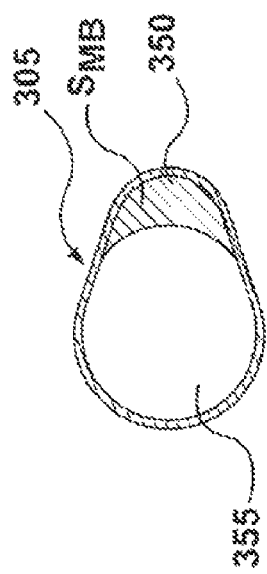
Figure 3A:
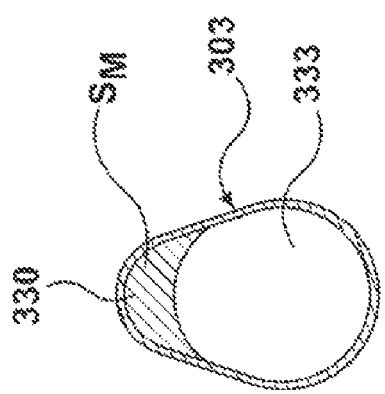

FIG. 3 is a perspective view of a hot runner manifold 300 with a melt channel configuration in accordance with another embodiment hereof. Features and aspects of the other embodiments may be used accordingly with the current embodiment. Cross-sections of primary melt channel 303, and secondary melt channels 305, 306 taken along lines A-A, B-B, and C-C are depicted in FIGS. 3A, 3B, and 3C respectively. One of ordinary skill in the art will appreciate that the body of manifold 300 is depicted with phantom lines for the purpose of depicting the melt channels within. Manifold 300 contains a heater 301, also shown in phantom, connected to a power source (not shown) for heating manifold 300, and subsequently the melt stream within the manifold channels, to a desired processing temperature. Manifold 300 may also contain other accessories such as a thermocouple (not shown) for monitoring the temperature of manifold 300, and providing feedback information to the power source.

Manifold 300 includes an inlet channel 302, which is in fluid communication with the melt channel of an inlet extension or sprue (not shown) connected thereto, and serves to deliver the melt stream from a melt source (not shown) to primiary melt channel 303. A cross-section of primary melt channel 303 taken along line A-A is depicted in FIG. 3A.

Manifold 300 may be formed from two complementary or mirrored plates which are brazed or otherwise integrally fastened together along complementary surfaces as shown at BL. An equal portion of the melt channel may be formed within the contacting surface of each plate or may be offset to one or the other side of the manifold. In an alternative embodiment, manifold 300 may not be brazed or otherwise integrally fastened together, but instead is removably fastened together by bolts or other fasteners (not shown) to facilitate cleaning of inlet channel 302 and melt channels 303, 305, and 306. In another embodiment, manifold 300 could be manufactured from a "lost wax" or other casting process. In yet another embodiment, manifold 300 could be manufactured by a process of additive manufacturing, nonlimiting examples of which include direct metal laser sintering and selective laser sintering, without departing from the scope of the invention.

Rather than having a circular cross-section as is shown in conventional manifold 112, primary melt channel 303 as well as secondary melt channels 305, 306 have asymmetrical, teardrop-shaped cross-sections as shown in FIGS. 3A, 3B and 3C. The teardrop-shaped cross-section may also be referred to as a pear-shaped cross-section. In addition, each of secondary melt channels 305, 306 has its teardrop-shaped cross-section turned 90° from the orientation of the teardrop-shaped cross-section of primary melt channel 303 but in opposite or opposing directions. With regard to the orientation of the teardrop-shaped cross-section of melt channels 303, 305, 306 of manifold 300, as primary melt channel 303 diverges into secondary melt channels 305, 306, a vertex of narrow portion 330 of primary melt channel 303 transitions from pointing towards an inlet side of manifold 300 to pointing towards an inside of the bend or transition that defines the directional change from primary melt channel 303 to secondary melt channels 305 and 306 respectively. This change in the orientation of the teardrop-shape is illustrated more clearly in FIGS. 3A, 3B, and 3C.

As previously discussed in FIG. 1, when melt enters manifold 112 through inlet channel 102 and is divided into opposing primary melt channels 103, the distribution of sheared material is such that there is a higher concentration of sheared material on the inlet side of primary melt channel 103. Referring now to the embodiment shown in FIGS. 3 and 3A, the distribution of shear after the melt travels from inlet channel 302 to primary melt channel 303 is shown within narrow portion 330 of melt channel 303 as shaded area SM. Since melt having more shear is hotter and has a lower viscosity than melt having less shear, the melt with more shear also flows at a higher velocity than melt having less shear. In order to prevent the melt having more shear from flowing faster than the remainder of the melt stream, the melt having more shear is directed through narrower portion 330 of primary melt channel 303 to slow that portion of the melt down while the remainder of the melt stream is allowed to flow through a wider portion 333 of primary melt channel 303. By flowing through wider portion 333, the melt with less shear and greater viscosity may be allowed to flow faster, if necessary, so that the velocity profile of the melt stream is relatively constant or balanced across primary melt channel 303.

In a similar manner, when the melt stream exits primary melt channel 303 and divides into secondary melt channels 305, 306, narrower portions 350, 360 of secondary melt channels 305, 306, respectively, are positioned to received the melt with more shear as represented by respective shaded areas $S_{MB}$, $S_{MC}$. Similar to primary melt channel 303, the melt having more shear is directed through narrower portions 350, 360 of secondary melt channels 305, 306 to slow that portion of the melt down while the remainder of the melt stream is allowed to flow through wider portions 355, 366 of secondary melt channels 305, 306, respectively, so that the velocity profile of the melt stream is generally constant or balanced across each of the secondary melt channels. Due to the balanced velocity of the melt stream received from primary melt channel 303, the melt having more shear as represented by shaded areas $S_{MB}$, $S_{MC}$ is substantially equal in each of secondary melt channels 305, 306.

The teardrop shape of melt channels 303, 305, 306 not only equalizes the melt flow velocity but also has an effect on the shear memory, or history, of the melt stream. The lower viscosity portion of the melt is in contact with less surface area in respective narrower portions 330, 350, 360 of melt channels 303, 305, 306, which reduces shear for the already less viscous and faster flowing melt. As the surface contact area is less in narrower portions 330, 350, 360 of melt channels 303, 305, 306, the shear and heating associated with shear are reduced, thereby reducing the temperature, increasing the viscosity and pressure drop, and decreasing the velocity of the melt as it flows through narrower portions 330, 350, 360. In turn, the higher viscosity portion of the melt is in contact with more melt channel surface area in respective wider portions 333, 355, 366 of melt channels 303, 305, 306, thereby increasing shear, and subsequently, the temperature of that portion of the melt stream. Correspondingly, the viscosity of the melt is decreased and the velocity of the melt increases as it flows through wider portions 333, 355, 366 of melt channels 303, 305, 306 respectively. Thus, the effect of the teardrop-shaped melt channel on the melt flowing therethrough is that the effects of shear on both sides of the melt stream may be substantially equalized as it passes through the unequal cross-section of melt channels 303, 305, 306 to thereby homogenize, or balance, the melt creating equalization of pressure drop, shear rate, viscosity, velocity and temperature. When the homogenized, or balanced, melt material reaches each mold cavity knot shown) at the same time and with similar shear histories, for e.g., after flowing through a respective secondary melt channel 305, 306 each of which ends at a respective level change 304 that is in fluid communication with a respective manifold outlet 308, 309, such that the melt material may be delivered to a hot runner nozzle (not shown) that is in fluid communication with the respective mold cavity, the molded parts formed therefrom may, desirably, have substantially identical material properties.

FIG. 4 is a perspective view of a hot runner manifold 400 with a melt channel configuration in accordance with another embodiment hereof. Features and aspects of the other embodiments may be used accordingly with the current embodiment. Similar to the previous embodiments, the body of manifold 400 is depicted with phantom lines for the purpose of depicting the melt channels within. Manifold 400 contains a heater 401, also shown in phantom, connected to a power source (not shown) for heating manifold 400, and subsequently the melt stream within manifold channels 402, 403, 405 and 406 to a desired processing temperature. Each of secondary melt channels 405, 406 ends at a level change 404 that is in fluid communication with a manifold outlet 408, 409, respectively, which in turn may each be in fluid communication with a melt channel of a hot runner nozzle (not shown) to deliver the melt stream to a mold cavity of a mold (not shown). Manifold 400 may also contain other accessories such as a thermocouple (not shown) for monitoring the temperature of manifold 400, and providing feedback to the power source.

Manifold 400 includes an inlet channel 402 in fluid communication with the melt channel of a manifold inlet extension (not shown) connected thereto, and serves to deliver the melt stream from a melt source (not shown) to primary melt channel 403. A cross-section of primary melt channel 403 taken along line A-A is depicted in FIG. 4A.

Manifold 400 may be formed from two complementary or mirrored plates which are brazed or otherwise integrally fastened together along complementary surfaces as shown at BL. An equal portion of the manifold channel may be formed within the contacting surface of each plate or offset to one or the other side of the manifold. In an alternative embodiment, manifold 400 may not be brazed or otherwise integrally fastened together, but instead is removably fastened together by bolts, or other fasteners (not shown) to facilitate cleaning of inlet channel 402 and melt channels 403, 405, and 406. In another embodiment, manifold 400 could be manufactured from a "lost wax" or other casting process. In yet another embodiment, manifold 400 could be manufactured by a process of additive manufacturing, nonlimiting examples of which include direct metal laser sintering and selective laser sintering without departing from the scope of the invention.

Referring to FIG. 4A, primary melt channel 403, as well as secondary melt channels 405, 406, have an asymmetrical, peanut-shaped, cross-section. Similar to manifold 300 of FIG. 3, as primary melt channel 403 diverges into secondary melt channels 405 and 406, a vertex of narrow portion 430 of primary melt channel 403 transitions from pointing towards the inlet side of manifold 400 to pointing towards an inside of the bend or transition that defines the directional change from primary melt channel 403 to secondary melt channels 405 and 406 respectively. Each of secondary melt channels 405, 406 has its peanut-shaped cross-section turned 90° from the orientation of the peanut-shaped cross-section of primary melt channel 403 but in opposite directions.

As previously discussed, when melt enters manifold 400 through inlet channel 402 and is divided into opposing primary melt channels 403, the distribution of sheared material is such that there is a higher concentration of sheared material on the inlet side of primary melt channel 403. As similarly discussed in the embodiment of FIG. 3, the melt having more shear, represented by shaded area SM in FIG. 4A, is directed through narrower portions of primary and secondary melt channels 403, 405, 406 to slow that portion of the melt down while the remainder of the melt stream is allowed to flow through wider portions of primary and secondary melt channels 403, 405, 406 so that the velocity profile of the melt stream is generally constant or balanced across each of the manifold melt channels, as well as the shear history as discussed above with reference to the embodiment of FIG. 3.

Figure 5A:
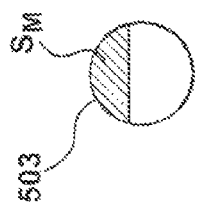
FIG. 5 is a representation of a portion of a manifold melt channel configuration in accordance with another embodiment hereof with FIGS. 5A, 5B and 5C being cross-sectional views taken along lines A-A, B-B and C-C, respectively, of FIG. 5.
Figure 5B:
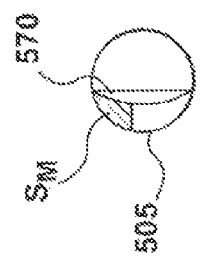
Figure 5C:
Figure 5:
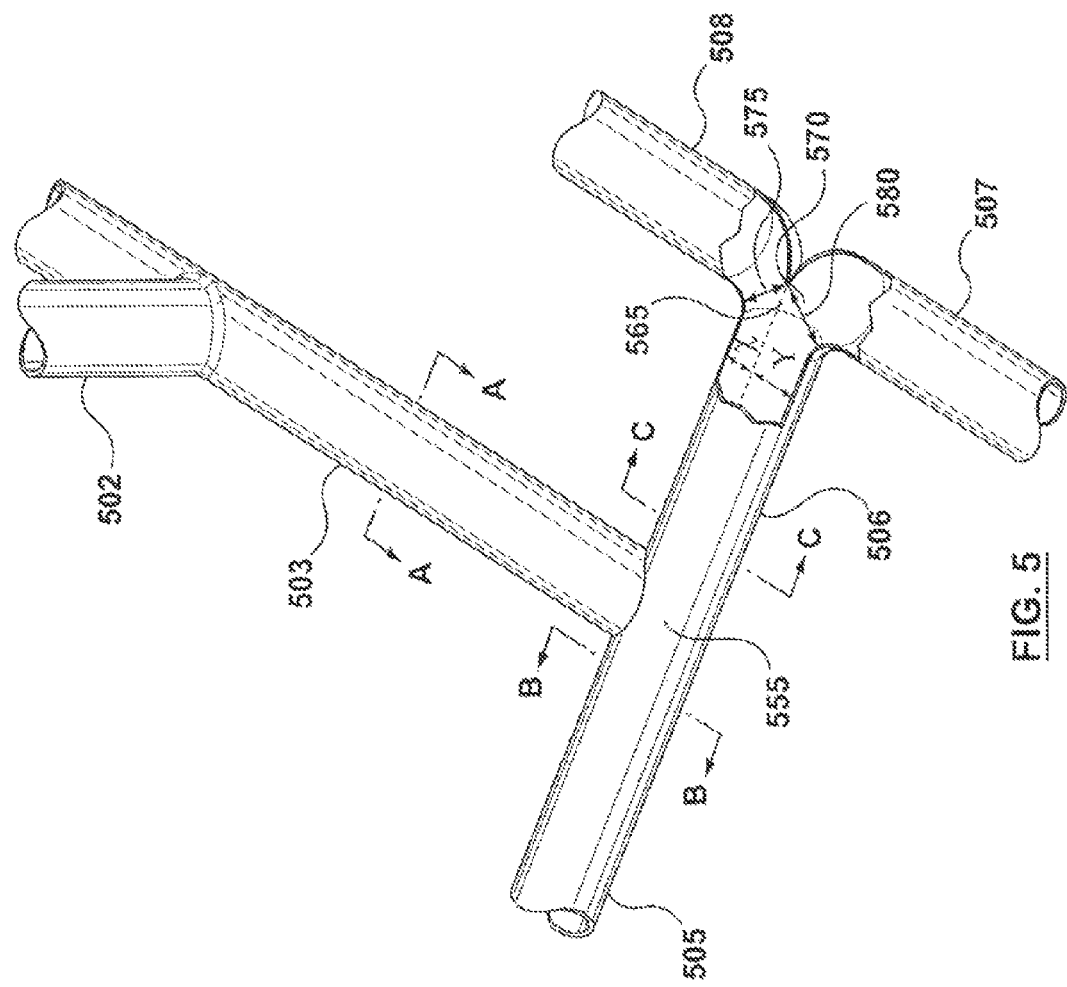

FIG. 5 is a representation of a portion of a manifold runner, or melt channel, configuration in accordance with another embodiment hereof with FIGS. 5A, 5B and 5C being cross-sectional views taken along lines A-A, B-B and C-C, respectively, of FIG. 5. Features and aspects of the other embodiments may be used accordingly with the current embodiment. Similar to what was previously discussed in FIG. 1 regarding the distribution of sheared material as it is divided from an inlet into primary melt channels, when melt enters the manifold (not shown) through inlet 502 and is divided into opposing primary melt channels 503 the distribution of sheared material is such that there is a higher concentration of sheared material on the inlet side of primary melt channel 503, as depicted in FIG. 5A. As the flow of melt continues downstream and divides again into secondary melt channels 505, 506 at intersection 555, the flow of sheared material in primary runner 503 is also divided as depicted in FIGS. 5B and 5C respectively.

In order to change the velocity or flow rate of the portion of the melt having more shear, represented by shaded area $S_M$ in FIG. 5C, a flow splitter 570 is formed at the intersection 565 of secondary melt channel 506 and tertiary melt channels 507, 508 between openings or inlets 580, 575 thereof. A person of ordinary skill in the art would understand that flow splitter 570 could also be placed at the intersection of secondary runner 505 and further downstream tertiary runners, and/or may be adapted for use at the intersection of any upstream runner and a further downstream runner where it is desirable to alter the flow characteristics of the melt and/or the distribution of shear in the melt. Opening 575 into tertiary melt channel 508 is narrower than opening 580 into tertiary melt channel 507. Flow splitter 570 is positioned such that an edge or point thereof is a distance "X" from a wall of secondary melt channel 506, where X is less than a radius of secondary melt channel 506 with distance "Y" being greater than X, to be offset from a central axis of the melt channel. With this configuration at the intersection between tertiary melt channels 507, 508, the melt having more shear is directed through opening 575 into tertiary melt channel 508 that is narrower than opening 580 into tertiary melt channel 507. The melt having more shear is effectively "throttled" as it passes through opening 575 and is slowed thereby as it enters tertiary melt channel 508 while the remainder of the melt stream that passes through wider opening 580 is allowed to flow more quickly into tertiary melt channel 507. In this manner, the velocity profile of the resulting melt streams in each of tertiary melt channels 507, 508 is generally equivalent, as well as constant or balanced across a diameter thereof. In addition, flow splitter 570 equalizes the pressure drop in each of tertiary melt channels 507, 508, which may otherwise have had a differential pressure drop.

In another embodiment, distances X and Y of the edge of flow splitter 570 may be such that openings 575, 580 can be sized to permit the melt flow to favor one tertiary melt channel 507, 508 over the other tertiary melt channel 507, 508. Flow splitter 570 according to this type of embodiment would be suitable for balancing cavity filling in applications with mold cavities of different sizes or shapes, a non limiting example of which includes family molding applications.

In an embodiment, flow splitter 570 may be a three dimensional surface, such as a ridge-like projection, made by using the modeling capabilities of 3D design software and is modeled using surface modeling and/or loft/sweep features. In other embodiments, flow splitter 570 may be machined into each plate used to form a two-piece brazed or other method of attaching the manifold halves described elsewhere herein, or be formed in a plug for appropriate insertion into a gun-drilled manifold. In other embodiments flow splitter 570 may be formed by any of the manufacturing methods described for the other embodiments.

Although each of the embodiments shown in FIGS. 2-5 show the melt stream being split into two secondary melt channels positioned at generally 90° to a primary melt channel, this is by way of illustration only and not limitation; the melt channels may split at any angle. It would be understood by one of ordinary skill in the art that the melt stream may be divided, into more than two melt channels that are at an angle other than 90° to the primary melt channel, for example, 45°, without departing from the scope of the present invention. Although each of the embodiments shown in FIGS. 2-5 shows the melt stream being split into a primary melt channels and then into secondary melt channels before exiting the manifold outlets, for e.g., manifold outlets 208, 209, 308, 309, 408, 409, this is by way of illustration only and not limitation; the melt channels may continue to divide into further tertiary or quaternary and quinary melt channels. It would be understood by one of ordinary skill in the art that the melt stream may be divided into any number of melt channels between the manifold inlet and outlets in order to fulfill the cavitational requirement of the injection molding application without departing from the scope of the present invention.

In each of the embodiments the manifold is depicted as having been constructed from two pieces brazed, or otherwise integrally fastened along a plane that is substantially perpendicular to the inlet of the manifold as shown, for example, in FIG. 2 at $B_L$. In an alternate embodiment, the manifold is made from more than two plates brazed, or otherwise integrally fastened together along two or more planes perpendicular to the inlet of the manifold such that at least a portion of the melt channels may be formed in the two or more surfaces which are brazed or otherwise integrally fastened together to create the manifold.

In yet another embodiment, the manifold may be constructed of two or more pieces that are brazed, or otherwise integrally fastened together along one or more planes that are substantially parallel to the inlet of the manifold, such that at least a portion of the melt channels may be formed in the two or more surfaces which are brazed or otherwise integrally fastened together to create the manifold.

Although each of the embodiments depict a manifold having only one type of non-circular melt channel, it may be desirable to use a combination of two or more of the various types of noncircular melt channels described herein depending on the injection molding application. Also, it may be desirable to use any of the previously described non-circular melt channels only in portions of the of the melt channel system, a nonlimiting example of which includes: a manifold with a melt channel configuration that transitions from circular to non-circular, and back to circular again at various points throughout the melt channel, such as, for example, immediately before, and/or during, and/or immediately after, a change in direction, or divide in the melt channel as dictated by the specific molding application.

Further, although sprue or inlet channels 202, 302, 402, 502 are shown in FIGS. 2-5 to have generally circular cross-sections, in accordance with embodiments hereof the sprue or inlet channels of a sprue fitting or component may also have any of the geometric cross-sections illustrated above without departing from the scope of the present invention. In addition in certain injection molding applications, a melt channel of a hot runner injection molding nozzle or a sprue bar may be formed having other than a circular cross-section in accordance with embodiments hereof, such as any of the geometric cross-sections illustrated above, to achieve the benefits noted above.

In an embodiment hereof, an injection molding manifold having melt channel configurations with cross-sectional geometries in accordance with embodiments hereof may be constructed as shown and described in U.S. Pat. No. 4,648,546 to Gellert, which is incorporated by reference herein in its entirety. In various other embodiment hereof, a manifold having melt channel configurations with cross-sectional geometries in accordance with embodiments hereof may be formed by laser sintering or other three dimensional printing manufacturing techniques, such as by adapting the manufacturing technique described in U.S. Pat. No. 5,745,834 to Bampton et al., which is incorporated by reference herein in its entirety.

Exemplary hot runner nozzles and mold cavity configurations that may be used in embodiments hereof are shown in U.S. Pat. No. 5,299,928 to Gellert, U.S. Pat. No. 5,591,465 to Babin, U.S. Pat. No. 6,318,990 to Gellert et al., U.S. Pat. No. 6,835,060 to Sicilia, U.S. Pat. No. 6,884,061 to Okamura et al., U.S. Pat. No. 7,168,943 to Dewar, and U.S. Pat. No. 7,306,455 to Dewar, each of which is incorporated by reference here in its entirety.

While various embodiments according to the present invention have been described above, it should be understood that they have been presented by way of illustration and example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. An injection molding system comprising;
   a hot runner manifold that includes an inlet channel for receiving a melt stream of moldable material from a melt source and at least one melt channel for conducting the melt stream of moldable material received from the inlet channel to manifold outlets, each of which is in fluid communication with a hot runner injection molding nozzle,
   wherein the at least one melt channel includes an upstream melt channel that splits into at least two downstream melt channels and
   wherein at least one of the upstream melt channel and the at least two downstream melt channels has a noncircular cross-section along substantially the respective lengths thereof, the upstream melt channel has a circular cross-section and the at least two downstream melt channels have a noncircular cross-section along substantially the respective lengths thereof, or the upstream melt channel has a noncircular cross-section along substantially the length thereof and the at least two downstream melt channels have a circular cross-section.

2. The injection molding system of claim 1, wherein the noncircular cross-section is selected from the group consisting of a capsule-shaped cross-section, an extended egg-shaped cross-section, and an oval cross-section.

3. The injection molding system of claim 2, wherein the noncircular cross-section includes semicircular end portions joined by a rectangular-shaped midsection.

4. The injection molding system of claim 3, wherein a width of the rectangular-shaped midsection is equal to two times a radius of the semicircular end portions.

5. The injection molding system of claim 1, wherein the noncircular cross-section of the melt channel is selected from the group consisting of a teardrop-shaped cross-section and a peanut-shaped cross-section.

6. The injection molding system of claim 1, wherein the upstream melt channel has a different noncircular cross-section than the noncircular cross-section of the at least two downstream melt channels.

7. The injection molding system of claim 1, wherein each of the upstream melt channel and the at least two downstream melt channels has the same noncircular cross-section.

8. An injection molding system comprising;
a hot runner manifold having melt channels for conducting a melt stream of moldable material received from a melt source to a plurality of hot runner injection molding nozzles, the melt channels including at least one upstream melt channel that splits into at least two downstream melt channels
wherein a flow splitter is positioned offset from a central axis of the upstream melt channel and protrudes between inlets of the downstream melt channels to thereby create a narrower inlet into one of the downstream melt channels and a wider inlet into the other of the downstream melt channels.

9. The injection molding system of claim 8, wherein the upstream melt channel and the at least two downstream melt channels have circular cross-sections.

10. The injection molding system of claim 8, wherein the flow splitter is formed at the intersection of the upstream melt channel and the at least two downstream melt channels.

11. The injection molding system of claim 8, wherein the flow splitter is a three dimensional surface.

12. The injection molding system of claim 8, wherein the flow splitter is a ridged projection.

13. An injection molding system comprising;
a hot runner manifold having a melt channel for conducting a melt stream of moldable material to at least one manifold outlet, wherein the melt channel has a runner segment with a noncircular cross-section, the runner segment being defined between a point where the melt stream is divided in the melt channel and one of a point where the melt stream experiences a level change in the melt channel and a point where the melt stream is divided again in the melt channel.

14. The injection molding system of claim 13, wherein the runner segment is defined between the point where the melt stream is divided in the melt channel and the point where the melt stream experiences a level change in the melt channel.

15. The injection molding system of claim 14, wherein the melt channel includes an inlet channel and wherein the point where the melt stream is divided in the at least one melt channel occurs at a downstream end of the inlet channel.

16. The injection molding system of claim 15, wherein the point where the melt stream experiences a level change in the melt channel is located directly upstream of the at least one manifold outlet.

17. The injection molding system of claim 15, wherein the melt channel includes an upstream runner segment with a circular cross-section that has a downstream end at the point where the melt stream is divided in the melt channel.

18. The injection molding system of claim 13, wherein the runner segment is defined between the point where the melt stream is divided in the melt channel and the point where the melt stream is divided again in the melt channel.

19. The injection molding system of claim 18, wherein the melt channel includes a downstream runner segment with a circular cross-section that is defined between the point where the melt stream is divided again in the melt channel and the point where the melt stream experiences a level change in the melt channel.

20. The injection molding system of claim 18, wherein the melt channel includes a downstream runner segment with a noncircular cross-section that is defined between the point where the melt stream is divided again in the melt channel and the point where the melt stream experiences a level change in the melt channel.

* * * * *

UNITED STATES PATENT AND TRADEMARK OFFICE
CERTIFICATE OF CORRECTION

PATENT NO. : 8,167,608 B2
APPLICATION NO. : 12/768522
DATED : May 1, 2012
INVENTOR(S) : Hitesh Kaushal et al.

Page 1 of 1

It is certified that error appears in the above-identified patent and that said Letters Patent is hereby corrected as shown below:

On title page 2 of the patent, item [56], under References Cited, U.S. Patent Documents, replace "2009/1002898" with -- 2009/0028984 --.

In column 8, line 67, replace "knot shown)" with -- (not shown) --.

In column 13, claim 5, line 15, delete "of the melt channel".

Signed and Sealed this
Twenty-ninth Day of January, 2013

David J. Kappos
*Director of the United States Patent and Trademark Office*